(12) United States Patent
Buchmann et al.

(10) Patent No.: US 7,492,807 B1
(45) Date of Patent: Feb. 17, 2009

(54) PSEUDO-RANDOM BIT SEQUENCE (PRBS) SYNCHRONIZATION FOR INTERCONNECTS WITH DUAL-TAP SCRAMBLING DEVICES AND METHODS

(75) Inventors: Peter Buchmann, Wald (CH); Martin Leo Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,878

(22) Filed: Apr. 7, 2008

(51) Int. Cl.
*H04B 1/00* (2006.01)
(52) U.S. Cl. .................. 375/130; 375/142; 375/143
(58) Field of Classification Search ................ 375/130, 375/142, 143, 150, 152, 372
See application file for complete search history.

(56) References Cited

U.S. PATENT DOCUMENTS

| | | | |
|---|---|---|---|
| 5,237,593 A | 8/1993 | Fisher et al. | |
| 6,999,544 B2 | 2/2006 | Cranford, Jr. et al. | |
| 2004/0114670 A1 | 6/2004 | Cranford, Jr. et al. | |
| 2005/0025191 A1 | 2/2005 | Vila et al. | |
| 2005/0047512 A1 | 3/2005 | Neff et al. | |
| 2006/0236183 A1 | 10/2006 | Zerbe et al. | |
| 2007/0008991 A1* | 1/2007 | Sridharan et al. | 370/474 |
| 2007/0165698 A1 | 7/2007 | Haque et al. | |
| 2008/0130891 A1 | 6/2008 | Sun et al. | |

* cited by examiner

*Primary Examiner*—Emmanuel Bayard
(74) *Attorney, Agent, or Firm*—Doster Greene, LLC

(57) ABSTRACT

A method for synchronizing interconnects in a link system according to various embodiments can include receiving input data at a transmit side, the transmit side including at least one pseudo-random bit sequence scrambler; scrambling the input data at the transmit side via the pseudo-random bit scrambler with dual tap sequences resulting in scrambled data; transmitting the scrambled data with the dual tap sequences along all lanes of a plurality of lanes to a receive side via a bus interconnecting the plurality of lanes, the receive side including at least one pseudo-random bit sequence descrambler; synchronizing the at least one pseudo-random bit sequence scrambler to the at least one pseudo-random bit sequence descrambler; using an edge detection or transition detection device for synchronization of the descrambler to the scrambler; and de-scrambling the transmitted scrambled data at the receive side resulting in the input data.

1 Claim, 18 Drawing Sheets

SELECTION OF LFSR TAP PAIRS
POLYNOMIAL: $X^{23} + X^{18} + 1$ (MAX. LENGTH = 8388607)

| TAP1 | TAP2 | PHASE SHIFT OF (TAP1 XOR TAP2) vs. X23 | POSSIBLE SELECTION FOR 14 LANES |
|---|---|---|---|
| X18 | X23 | 23 | |
| X17 | X22 | 24 | |
| X16 | X21 | 25 | |
| X15 | X20 | 26 | |
| X14 | X19 | 27 | |
| X13 | X18 | 28 | |
| X12 | X17 | 29 | |
| X11 | X16 | 30 | |
| X10 | X15 | 31 | |
| X9  | X14 | 32 | |
| X8  | X13 | 33 | |
| X7  | X12 | 34 | |
| X6  | X11 | 35 | |
| X5  | X10 | 36 | |
| X4  | X9  | 37 | |
| X3  | X8  | 38 | |
| X2  | X7  | 39 | |
| X1  | X6  | 40 | LANE 0 |
| X13 | X23 | 46 | |
| X12 | X22 | 47 | |
| X11 | X21 | 48 | |
| X10 | X20 | 49 | |
| X9  | X19 | 50 | |
| X8  | X18 | 51 | |
| X7  | X17 | 52 | |
| X6  | X16 | 53 | |
| X5  | X15 | 54 | |
| X4  | X14 | 55 | |
| X3  | X13 | 56 | |
| X2  | X12 | 57 | |
| X1  | X11 | 58 | |
| X3  | X23 | 92 | |
| X2  | X22 | 93 | |
| X1  | X21 | 94 | |
| X16 | X23 | 645481 | |
| X15 | X22 | 645482 | |
| X14 | X21 | 645483 | |
| X13 | X20 | 645484 | |
| X12 | X19 | 645485 | |
| X11 | X18 | 645486 | |
| X10 | X17 | 645487 | |
| X9  | X16 | 645488 | |
| X8  | X15 | 645489 | LANE 1 |
| X7  | X14 | 645490 | |
| X6  | X13 | 645491 | |
| X5  | X12 | 645492 | |
| X4  | X11 | 645493 | |
| X3  | X10 | 645494 | |
| X2  | X9  | 645495 | |
| X1  | X8  | 645496 | |
| X9  | X23 | 1290962 | |
| X8  | X22 | 1290963 | |
| X7  | X21 | 1290964 | |
| X6  | X20 | 1290965 | |
| X5  | X19 | 1290966 | LANE 2 |
| X4  | X18 | 1290967 | |
| X3  | X17 | 1290968 | |
| X2  | X16 | 1290969 | |
| X1  | X15 | 1290970 | |
| X19 | X23 | 1727627 | |
| X18 | X22 | 1727628 | |
| X17 | X21 | 1727629 | |
| X16 | X20 | 1727630 | |
| X15 | X19 | 1727631 | |
| X14 | X18 | 1727632 | |
| X13 | X17 | 1727633 | LANE 3 |
| X12 | X16 | 1727634 | |
| X11 | X15 | 1727635 | |
| X10 | X14 | 1727635 | |
| X9  | X13 | 1727636 | |
| X8  | X12 | 1727637 | |
| X7  | X11 | 1727638 | |
| X6  | X10 | 1727640 | |
| X5  | X9  | 1727641 | |

| | | | | |
|---|---|---|---|---|
| X3 X2 X1 | X19 X18 X17 | 6910512 6910513 6910514 | | |
| X11 X10 X9 X8 X7 X6 X5 X4 X3 X2 X1 | X23 X22 X21 X20 X19 X18 X17 X16 X15 X14 X13 | 7713434 7713435 7713436 7713437 7713438 7713439 7713440 7713441 7713442 7713443 7713444 | LANE 13 | |
| X5 X4 X3 X2 X1 | X23 X22 X21 X20 X19 | 8388602 8388603 8388604 8388605 8388606 | | |

FIG. 8D

| DS LANE | 0, 8, s1 | 1, 9 | 2, 10 | 3, 11 | 4, 12 | 5, s0 | 6 | 7 |
|---|---|---|---|---|---|---|---|---|
| US LANE | 0, 8, 16 | 1, 9, 17 | 2, 10, 18 | 3, 11, 19 | 4, 12, s0 | 5, 13, s1 | 6, 14 | 7, 15 |
| TAPS | $x^{13}+x^{18}$ | $x^7+x^{14}$ | $x^{11}+x^{15}$ | $x^{12}+x^{20}$ | $x^{10}+x^{16}$ | $x^8+x^{17}$ | $x^{19}+x^{21}$ | $x^5+x^6$ |

FIG. 9

PSEUDO-RANDOM BIT SEQUENCE (PRBS) SYNCHRONIZATION FOR INTERCONNECTS WITH DUAL-TAP SCRAMBLING DEVICES AND METHODS

FIELD

The present teachings relate to devices and methods for pseudo-random bit sequence (PRBS) synchronization for interconnects with dual-tap scrambling.

INTRODUCTION

In wire-based communication systems, information additional to the system data is typically queued up and transmitted in series with the system data as bandwidth permits. One problem of particular concern to communication systems having data rates in the Gbit/s range is that the printed wires of a printed circuit board (PCB) backplane or the lossy transmission lines of a ceramic multi-chip carrier introduces large amounts of unwanted intersymbol interference (ISI) in the data transmission system.

One conventional method employed to reduce ISI introduced timing jitter is based on coding or scrambling of the data stream to guarantee that no long run lengths occur. Specifically, data scrambling, such as, for example, with pseudo-random bit sequences (PRBS) may be used in high-speed interconnects such as, for example, processor-memory links to improve performance by reducing ISI. In communication systems, a scrambler is defined as a device that manipulates by "randomizing" a data stream before transmitting. The manipulations are reversed by a descrambler, which removes the randomization, at the receiving side. Scrambling techniques are widely used in satellite, radio relay communications, high-speed board-to-board and chip-to-chip communication, such as in processor-memory systems.

One conventional scrambler, as shown in FIG. 1, is an additive scrambler, which transforms an input data stream by applying a PRBS by modulo-two adder, also known as an exclusive OR (XOR) gate. Typically, a simple conventional PRBS generator may be implemented electronically by a linear feedback shift register (LFSR). Sometimes a pre-calculated PRBS stored in memory is used to generate the PRBS, but more often the PRBS is generated by an LFSR.

In an LFSR, the feedback function is simply the XOR of certain bits in the register, which are referred to as "taps". As the bits shift within the register, the list of bits' positions that affect the next state is called the "tap sequence." In other words, the taps are the outputs that influence the input.

The tap sequence of an LFSR can be represented as a feedback polynomial or characteristic polynomial. For example, FIG. 1 is a 14-bit LFSR tapped at the $14^{th}$, $13^{th}$, $12^{th}$, $2^{nd}$ and $1^{st}$ bits and the corresponding polynomial is:

$$x^{14}+x^{13}+x^{12}+x^2+1.$$

The powers of the terms represent the tapped bits, counting from the left. The first and last bits are always connected as an input and tap, respectively. In the diagram of FIG. 1, the tap sequence is [14, 13, 12, 2, 0], where the 0 corresponds to the $x^0=1^{st}$ bit. The taps are XOR'd sequentially with the output and then feed back into the leftmost bit.

Conventional additive scramblers, as discussed above, are commonly referred to as synchronous. In order to assure a synchronous operation of the transmitting and receiving LFSR, a sync word is typically used.

In computing, a sync word is used to synchronize data. For example, when a receiver is receiving a bit stream of data, it needs to know where the header information starts. A pre-defined sync word is used to indicate the start of data. The sync word is a pattern that is placed in the data stream through equal intervals (that is, in each frame). A receiver searches for a few sync words in adjacent frames and hence determines the place when its LFSR must be reloaded with a pre-defined initial state or value, called the "seed", which is used to set the initial state of the generator.

If the LFSR is initialized with an initial seed value, it will produce a sequence of internal states before repeating. Because the operation of the register is deterministic, the sequence of values produced by the register is completely determined by its current (or previous) state. Because the register has a finite number of possible states, it must eventually enter a repeating cycle. However, an LFSR with a well-chosen feedback function can produce a sequence of bits which appears random and which has a very long cycle.

In parallel-lane configurations, such as bus-like interconnects, typically, it is beneficial to employ time-shifted maximum-length PRBS sequences for the scrambling of each lane. The first number of the polynomial is the length of the LFSR. The period of a shift register is the length of the output sequence before it starts repeating. Many examples of tables of primitive polynomials from which maximal LFSRs can be constructed can be found in numerous references, which is beyond this discussion.

One benefit of employing time-shifted maximum length PRBS sequences is that this configuration avoids lane-to-lane correlation and minimizes cross-talk. In such a configuration, the time shifts should exceed the expected maximum lane-to-lane skew which may be fairly large in applications such as fully-buffered dual in-line memory module (FB-DIMM: 46 UI; FB-DIMM successors: ~90 Unit Interval (UI)). Time-shifted PRBS sequences are simply produced by an XOR function of two LFSR taps, as described above. The binomial order of the PRBS sequence should be large enough to allow the selection of the tap pairs for a given number of lanes with the required phase separation. Furthermore, selection of the taps should minimize the LFSR load imbalance.

Scrambling with PRBS sequences requires synchronization of the generator LFSRs in the transmitter (TX) with the analyzer LFSR in the receiver (RX) during the system's startup or training sequence. In conventional devices, this is usually achieved by seeding of the RX LFSR with the PRBS sequence from the TX, but this only works in conventional devices if the sequence is produced by a single tap. Therefore, one conventional solution is to scramble the data of one lane (hereinafter referred to as "lane XX") with the PRBS sequence from a single LFSR tap, while all other lanes use tap-pair sequences. Such a configuration allows the LFSR seeding technique to be applied on lane XX, as shown in FIG. 2. Another conventional solution is to externally send a synchronization control signal to both the transmitter and to the receiver that initiates a parallel load operation of the PRBS LFSRs with a fixed starting pattern. A mechanism to adapt the delay of this control signal to the data delay needs to be provided at high transmission speeds. Yet another conventional, but rather complex solution is to transmit part of the synchronization and delay information from a TX controller on the data lanes unscrambled, so that a controller in the RX can parallel load a predetermined pattern into the RX LFSR in sync with the TX, as depicted in FIG. 3.

Therefore, it may be desirable to provide a synchronization device and apparatus that allow synchronization of the RX PRBS analyzer with the TX PRBS generator in situations where all lanes are scrambled with dual-tap sequences, and the transmission of unscrambled information across the link is not permitted. It may also be desirable to provide time shifts that exceed the expected maximum lane-to-lane skew, even for fairly large applications. It may further be desirable to provide a binomial order of the PRBS sequence that is large enough to allow the selection of the tap pairs for a given number of lanes satisfying the required phase separation. It may also be desirable to provide a device and method capable of selecting taps that minimizes a communication's system LFSR load imbalance.

SUMMARY

The present invention may satisfy one or more of the above-mentioned desirable features. Other features and/or aspects may become apparent from the description which follows.

A method for synchronizing interconnects in a link system according to various embodiment can include receiving input data at a transmit side, the transmit side including at least one pseudo-random bit sequence scrambler; scrambling the input data at the transmit side via the pseudo-random bit scrambler with dual tap sequences resulting in scrambled data; transmitting the scrambled data with the dual tap sequences along all lanes of a plurality of lanes to a receive side via a bus interconnecting the plurality of lanes, the receive side including at least one pseudo-random bit sequence descrambler, and the receive side directly connected to the transmit side via the bus; synchronizing the at least one pseudo-random bit sequence scrambler to the at least one pseudo-random bit sequence descrambler, wherein the synchronizing comprises: transmitting from the transmit side to the receive side a synchronization notification via an out-of-band communication; transmitting from the transmit side all zero bits to the receive side; loading a scrambling pattern into the at least one pseudo-random bit sequence scrambler and transmitting the scrambled data from the transmit side to the receive side; detecting a state transition within the transmitted scrambled data employing an edge detection device positioned at the receive side of one of the plurality of lanes used as a synchronization lane; loading and initiating within the at least one pseudo-random bit sequence descrambler a predetermined descrambling pattern; de-scrambling the transmitted scrambled data at the receive side resulting in the input data; after completing the synchronizing, performing a skew correction on the synchronization lane by adjusting at least one FIFO pointer on the synchronization lane; and after skew correcting the synchronization lane, performing a skew correction on any remaining skewed lanes of the plurality of lanes by adjusting at least one FIFO pointer on each of the skewed lanes.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The skilled artisan will understand that the drawings described below are for illustrative purposes only. The drawings are not intended to limit the scope of the present teachings in any way.

Figure 8B:
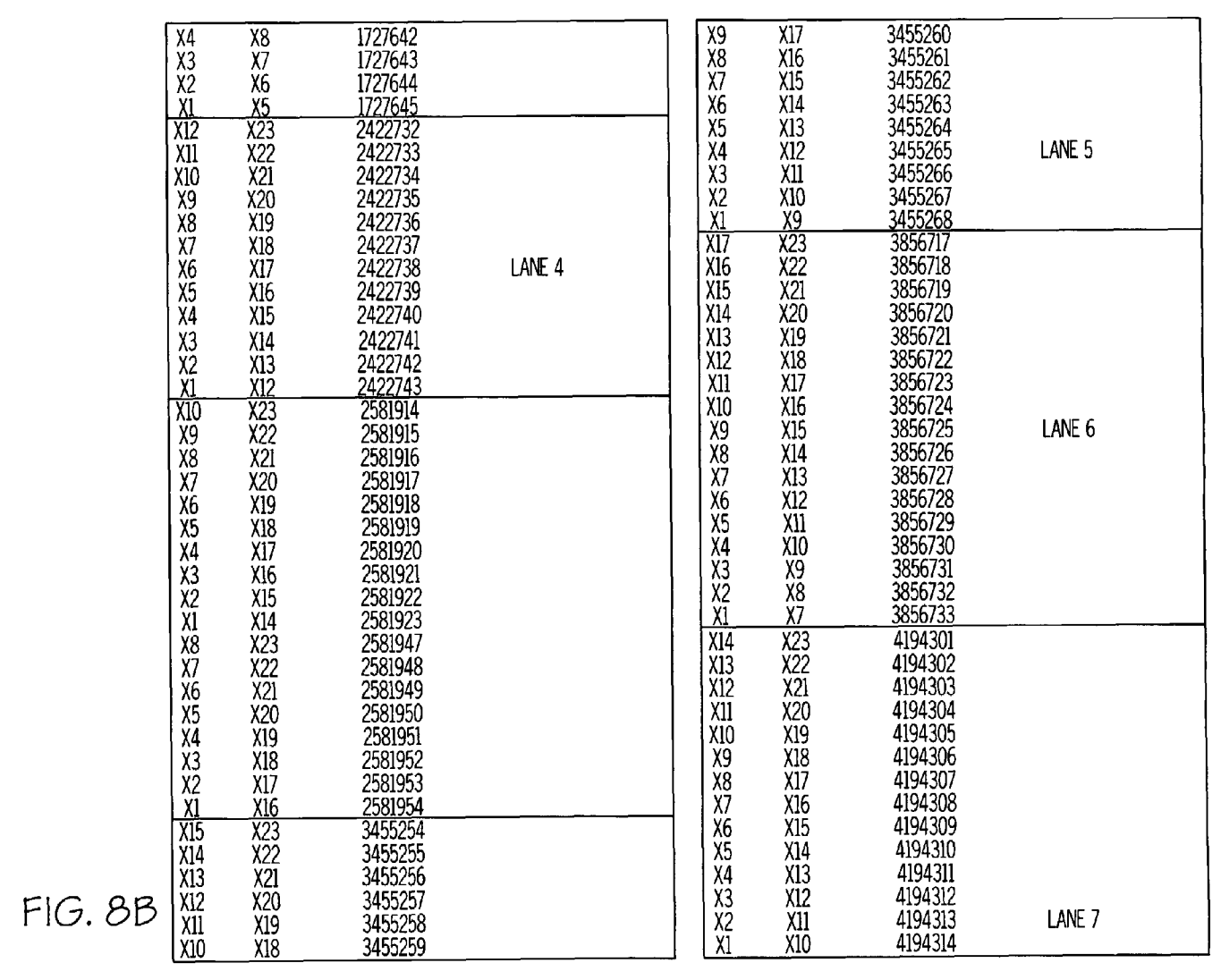
Figure 8C:
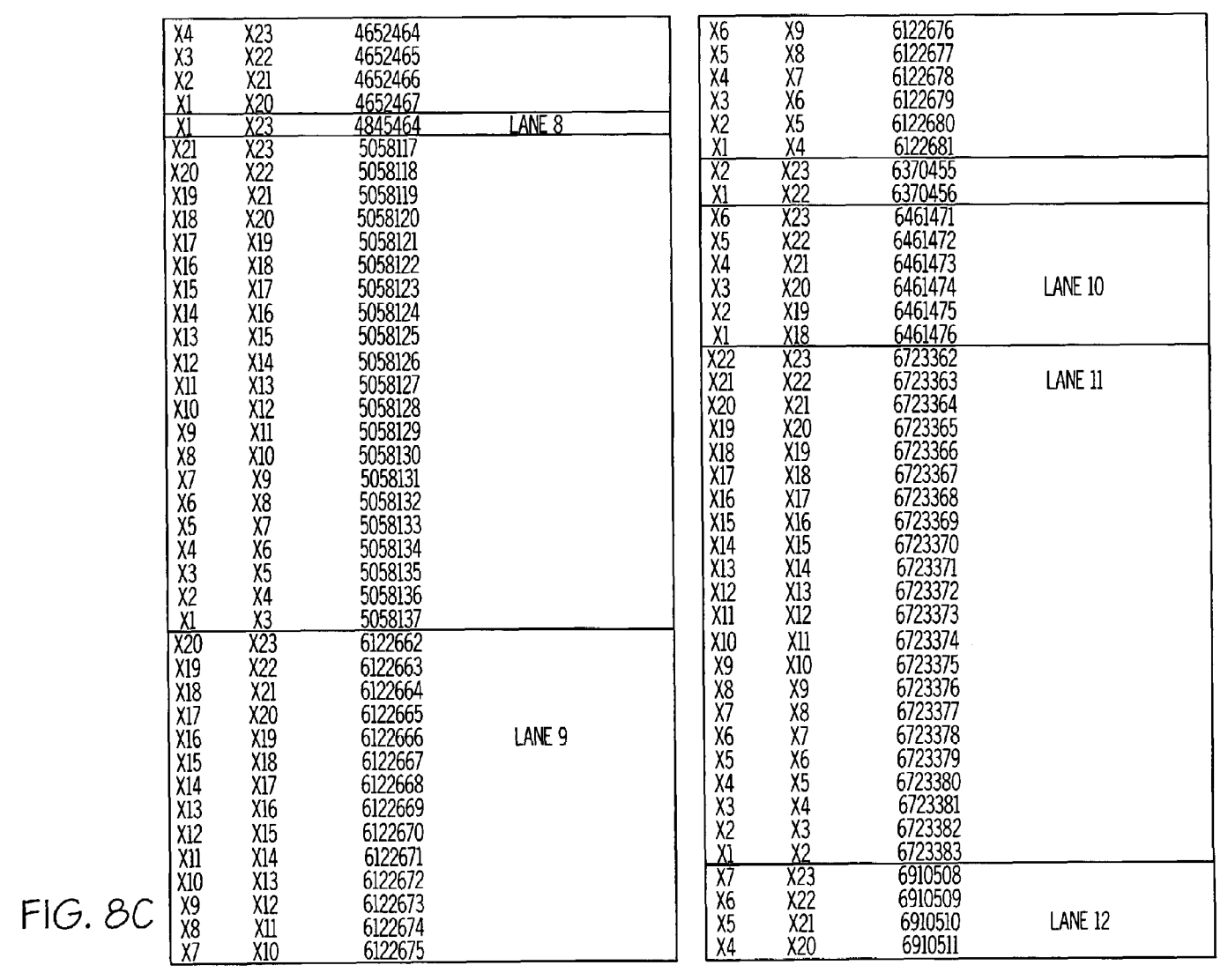

FIGS. 8A-8D illustrates an example of tap selections that may be employed as tap pairs in a dual tap sequence in accordance with the present teachings;

FIG. 9 illustrates another example of tap selections that may be employed as tap pairs in a dual tap sequence in accordance with the present teachings;

DESCRIPTION OF THE EMBODIMENTS

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

The method and apparatus described herein provide a technique that avoids the drawbacks of the methods and devices described above. Various embodiments of the synchronization device and apparatus may allow synchronization of the RX PRBS analyzer with the TX PRBS generator in situations where all lanes are scrambled with dual-tap sequences, and the transmission of unscrambled information across the link is not permitted.

In various embodiments, the device and method may provide time shifts that exceed the expected maximum lane-to-lane skew, even for a fairly large application. Various embodiments may provide a binomial order of the PRBS sequence that is large enough to allow the selection of the tap pairs for a given number of lanes with the required phase separation. In various embodiments, the device and method may be capable of selecting taps that minimizes a communication's system LFSR load imbalance.

Figure 1:
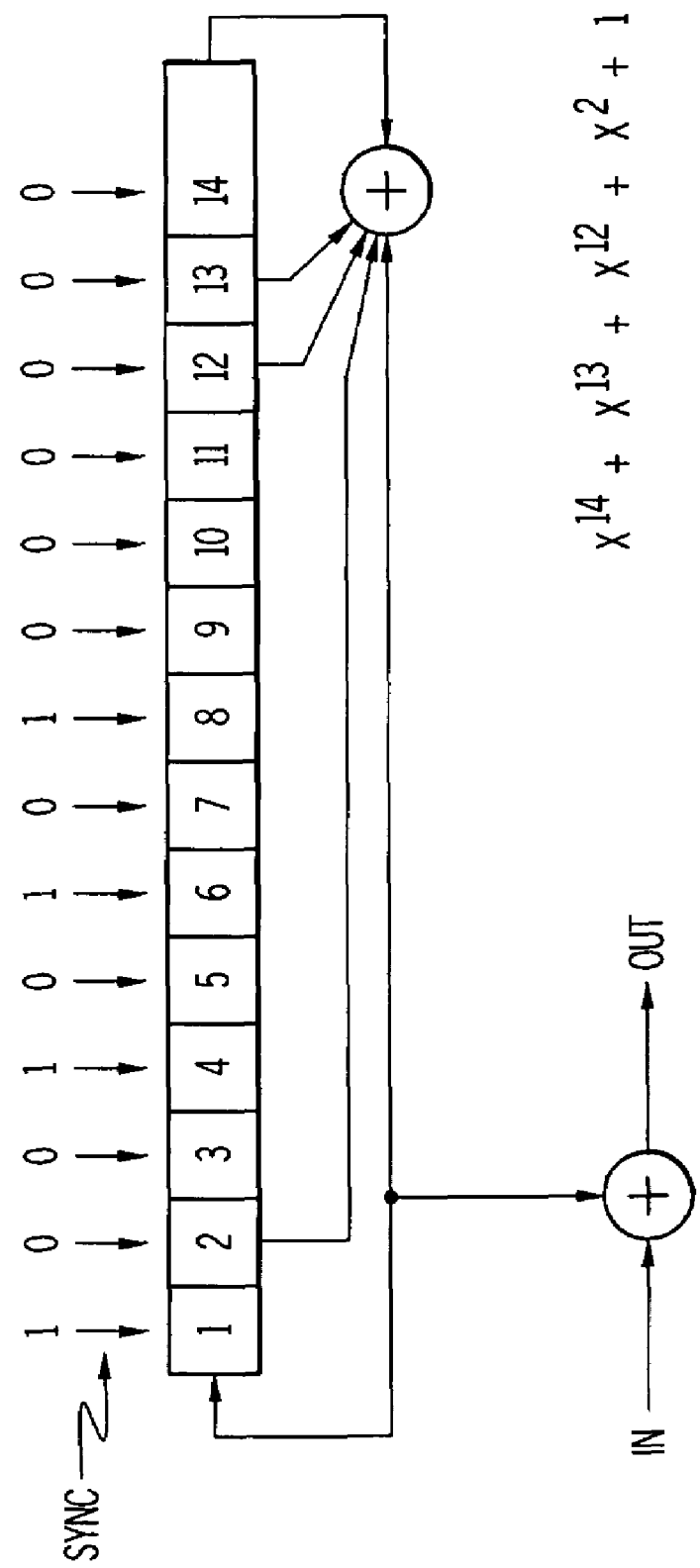
FIG. 1 is an example of a PRBS LFSR.
Figure 2:
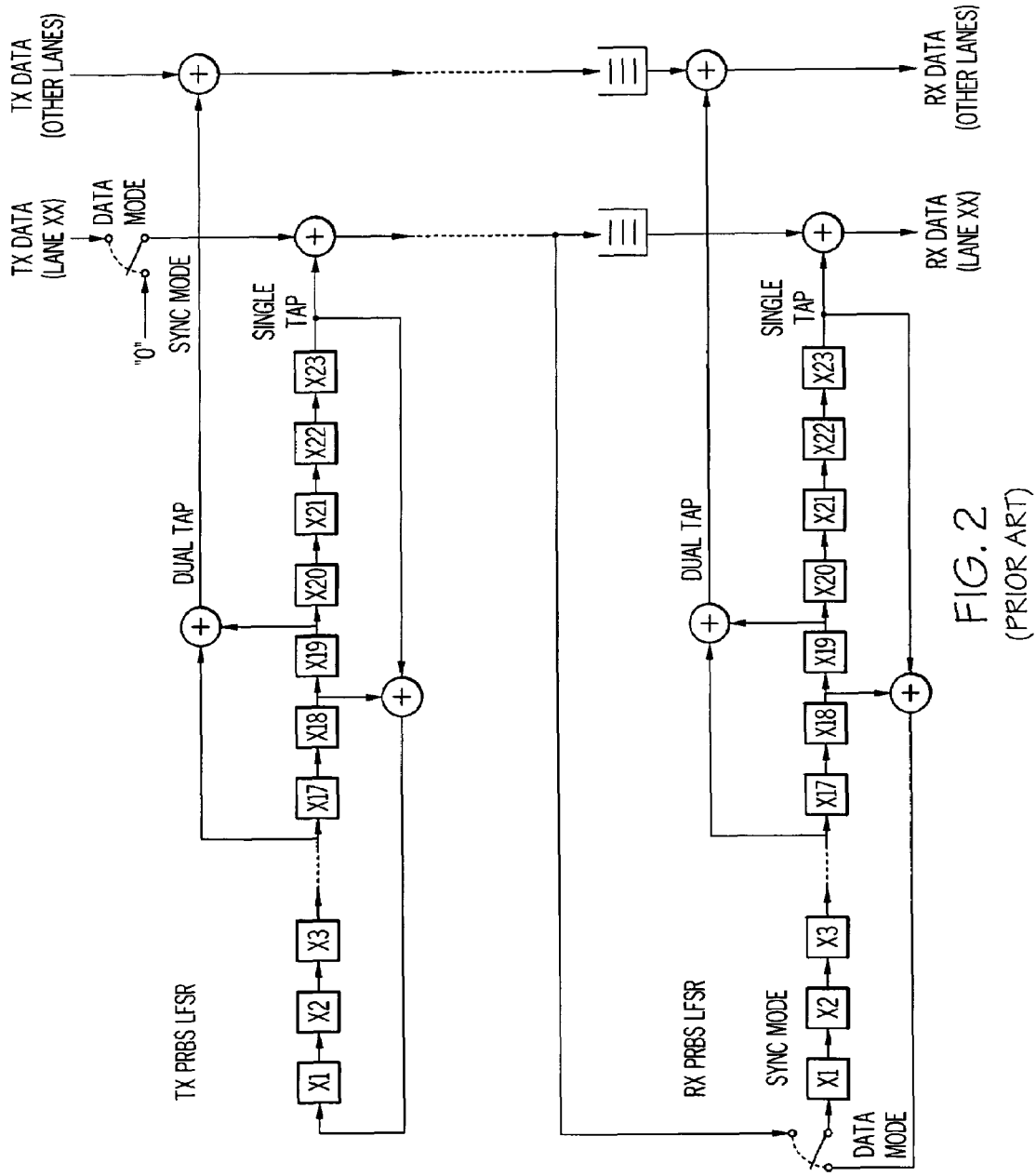
FIG. 2 is an example of a conventional device, showing the seeding of the RX LFSR with the incoming pattern of a lane XX with single tap scrambling in the sync mode.
Figure 3:
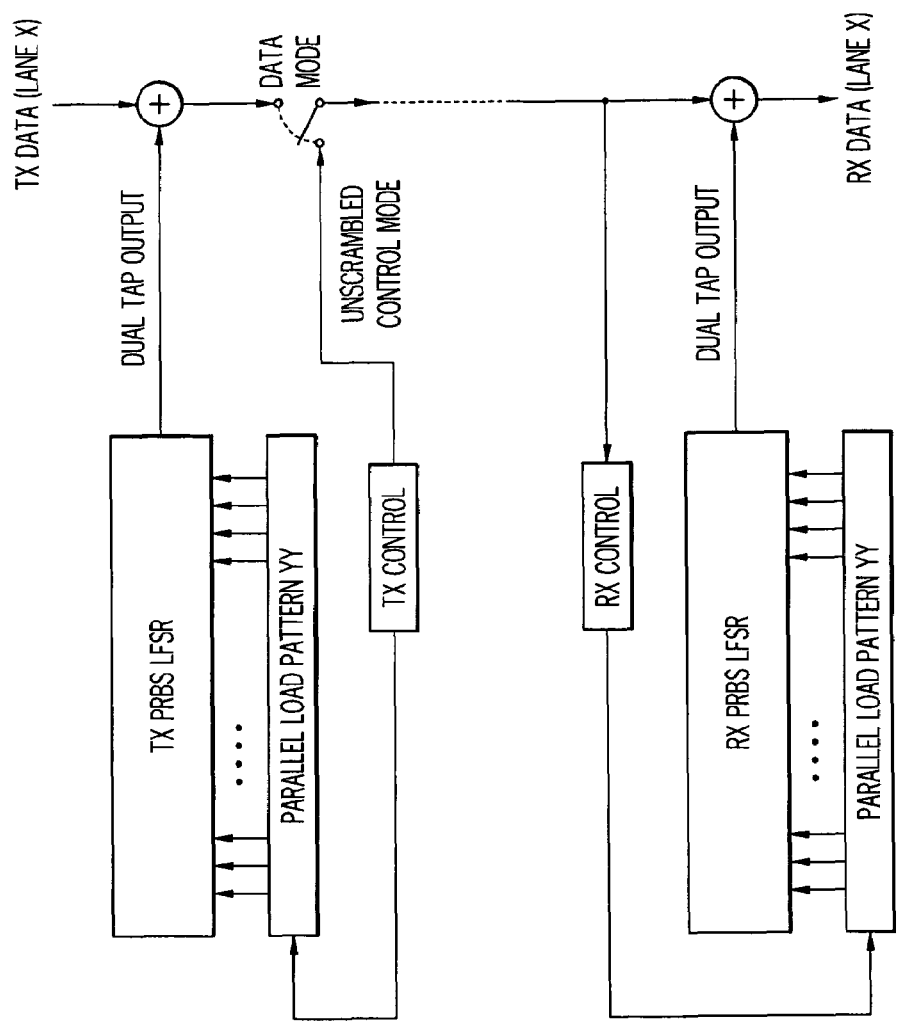
FIG. 3 is an example of a rather complex alternative implementation of dual tap scrambler synchronization where sync timing information is sent unscrambled from a TX controller to an RX controller establishing timing adjusted parallel load initialization of the TX and RX LFSRs with an identical pattern.
Figure 4:
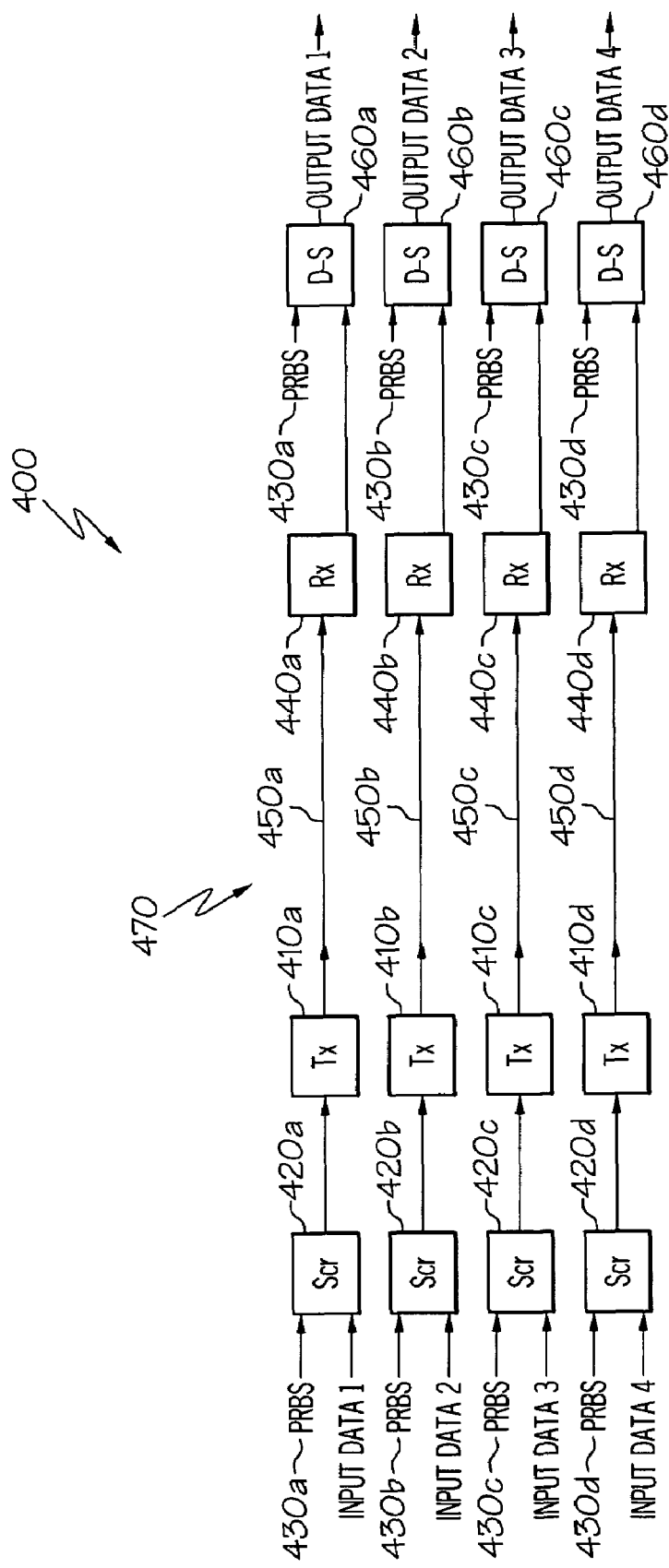
FIG. 4 depicts an example of a link system that may be used in accordance with the present teachings.

An exemplary embodiment of a synchronization method and device of a link system 400 that can be used, for example, to allow synchronization of a RX PRBS analyzer with a TX PRBS generator wherein all the lanes are scrambled with dual-tap sequences, is illustrated in FIG. 4. FIG. 4 depicts an example of a link system that may be used in various embodiments. Link system 400 may include one or more transmitters (TX) 410 on a transmitting side interconnected via at least one transmitting lane 450 with one or more receivers (RX) 440 on the receiving side. Each transmitter (TX) 410a, 410b, 410c, and 410d may connect to a respective scrambler 420a, 420b, 420c, and 420d. Each of the scramblers 420a, 420b, 420c, and 420d receives input data and a respective scrambling pattern 430a, 430b, 430c, and 430d.

Each scrambling patterns 430a, 430b, 430c, and 430d may be generated, for example, by a pseudo-random number generator. Each scrambler 420a, 420b, 420c, and 420d applies a pseudo-random bit sequence to the received input data. Scramblers 420a, 420b, 420c, and 420d may use one or more algorithms to generate the scrambling pattern from the pseudo-random bit sequence (PRBS). In one embodiment, the data may be scrambled by Exclusive-ORing (XOR) the data with the PRBS, as shown, for example in FIG. 6 and described below. Respective linear feedback shift registers (LFSR) may generate each PRBS using a predetermined polynomial. The scrambled data are transmitted in synchrony onto transmitting lane 450.

During operation, the receivers and the transceivers may be synchronized such that the scrambled data is transmitted from the TX via a bus 470 to receivers 440a, 440b, 440c, and 440d. Bus 470 contains the plurality of transmitting lanes 450 and may be a group of wires that conveys information to numerous devices or components within a system. The information may be data, commands or addresses, or all three transmitted serially, in parallel or in a combination. Thus, bus 470 may contain both control lines and data lines. For example, according to an embodiment, bus 470 may be a bus separated into multiple parallel communication paths, (i.e., "lanes"), as shown for example in FIGS. 11A-C.

After receiving the scrambled data, receivers 440a, 440b, 440c, and 440d transmit the data to descramblers 460a, 460b, 460c, and 460d. In order to reverse the operation of the scramblers 420a, 420b, 420c, 420d and to obtain the output data, which is the original data transmitted by the transceivers. Descrambler 460a, 460b, 460c and 460d may be configured to receive the pseudo-random bit sequence and select a descrambling pattern in accordance with a predetermined algorithm.

It will be understood by those skilled in the art that various equivalent means for scrambling and descrambling the data stream may be used in accordance with the present teachings of the device and method. For instance, scramblers 420 and descramblers 460 may be provisioned to use the same scrambling and descrambling patterns but applied to perform opposite operations.

Figure 5:
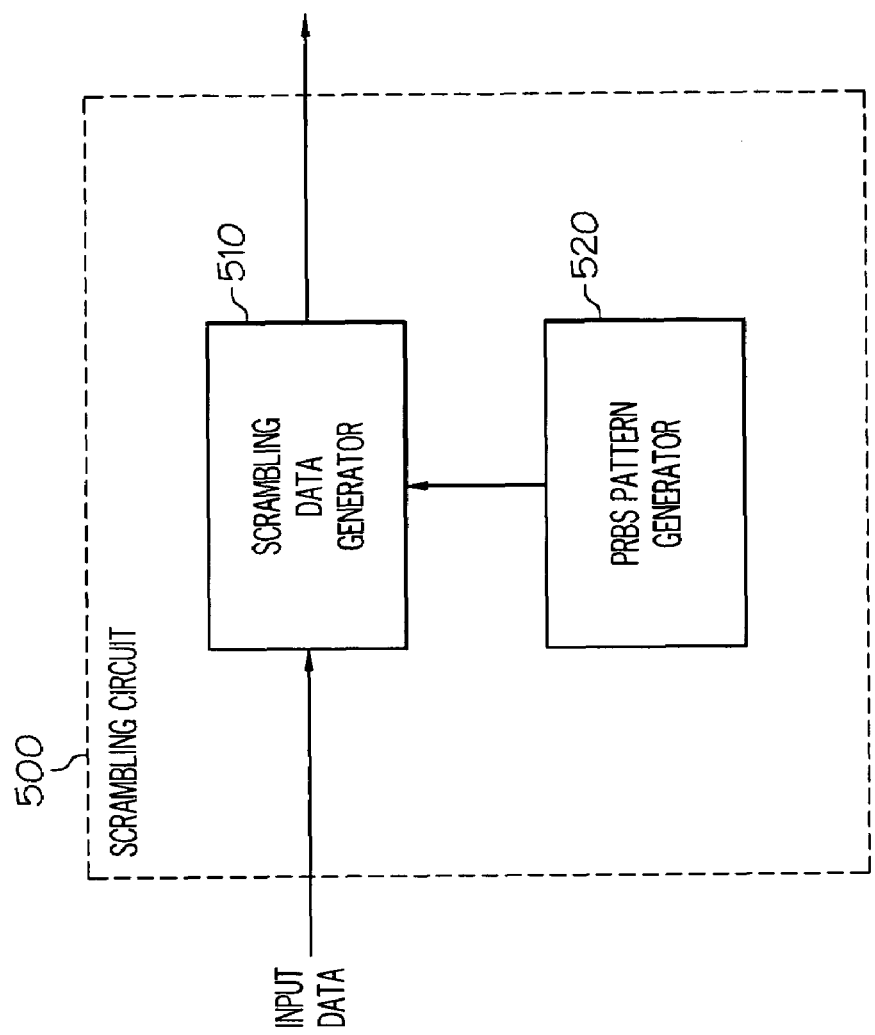
FIG. 5 depicts a functional block diagram of scrambling/descrambling and a constructional example of a PRBS pattern generator that may be used in accordance with the present teachings.

For example, FIG. 5 depicts a functional block diagram of scrambling/descrambling and a constructional example of a PRBS pattern generator that may be used with the present teachings of the device and method. Referring to FIG. 5, a scrambling circuit 500 may include a scrambling data generator unit 510 and a PRBS generator 520. Based on a PRBS pattern generated by the PRBS pattern generator 520, the scrambling data generator unit 510 scrambles the input data. The representative scrambling circuit 500 may be used in each respective scrambler 420a, 420b, 420c, and 420d shown in FIG. 4. In various embodiments, each PRBS generator 520 may be configured to generate the same or a different scrambling pattern. Therefore, each PRBS pattern may be generated from the same or a different generation polynomial.

Figure 6:
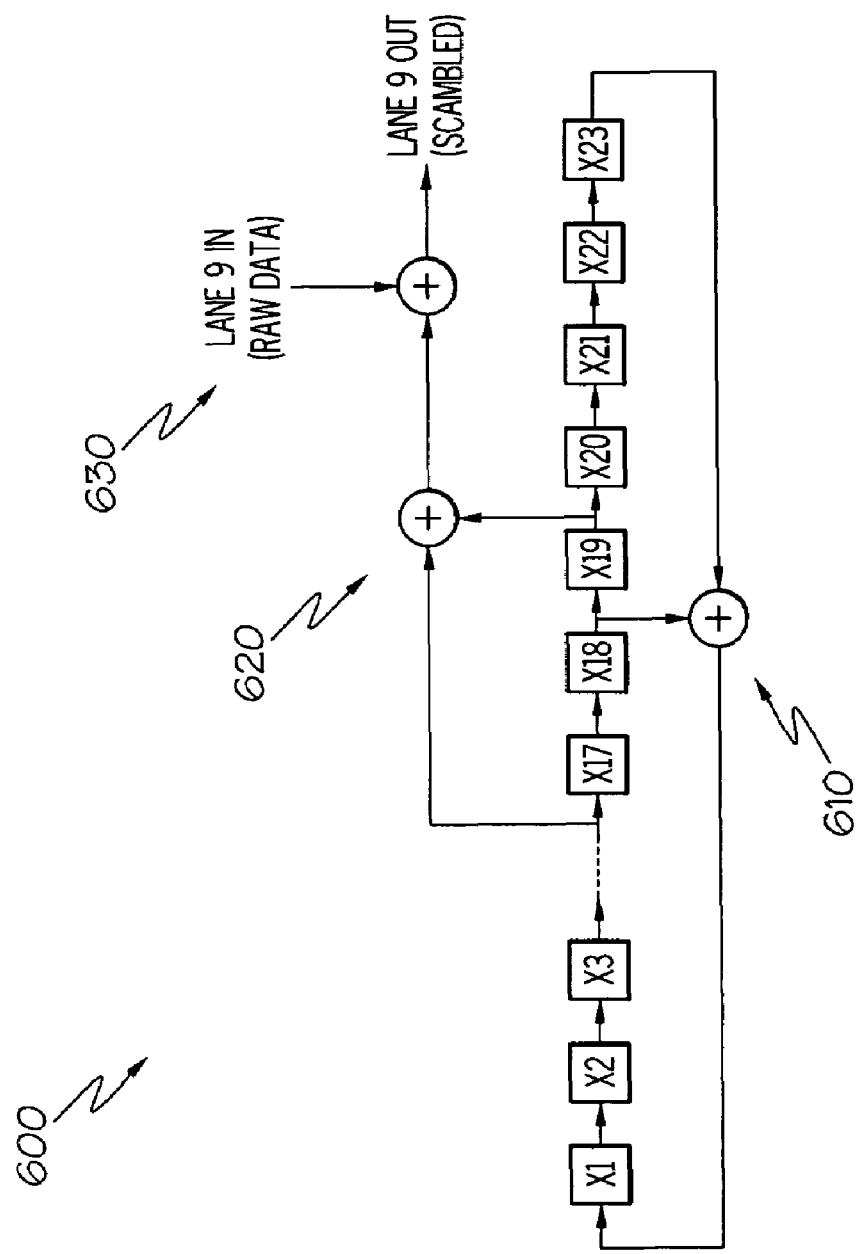
FIG. 6 depicts an exemplary embodiment of an additive scrambler consistent with the scrambling technique described in accordance with the present teachings.

FIG. 6 depicts an exemplary embodiment of an additive scrambler consistent with the scrambling technique described herein and composed of an LFSR 600, which is a 23-bit LFSR. In at least one embodiment of LFSR 600, the taps are the $23^{rd}$ and $18^{th}$ bits. The resulting LFSR characteristic polynomial is $x^{23}+x^{18}+1$. Tap 23 is XORed with tap 18 by XOR 610, the result being fed back to the input of LFSR 600. In this 23-bit LFSR example, there are 18 groups of taps combinations with a delay >90 Unit Interval (UI) and balanced LFSR loading is possible. The unit interval ("UI") is the duration of any one bit in the data signal.

LFSR 600 is exemplary only and the choice of an LFSR characteristic polynomial may be dependent on the communications interface in which the scrambling technique of the device and method operates. For example, in some embodiments, the generator polynomial may be a PRBS-15 generator having a characteristic polynomial that is $x^{15}+x^{14}+1$, wherein there are only 10 groups of tap combinations with a delay >90 UI and some of the taps may be heavily loaded.

Figure 7:
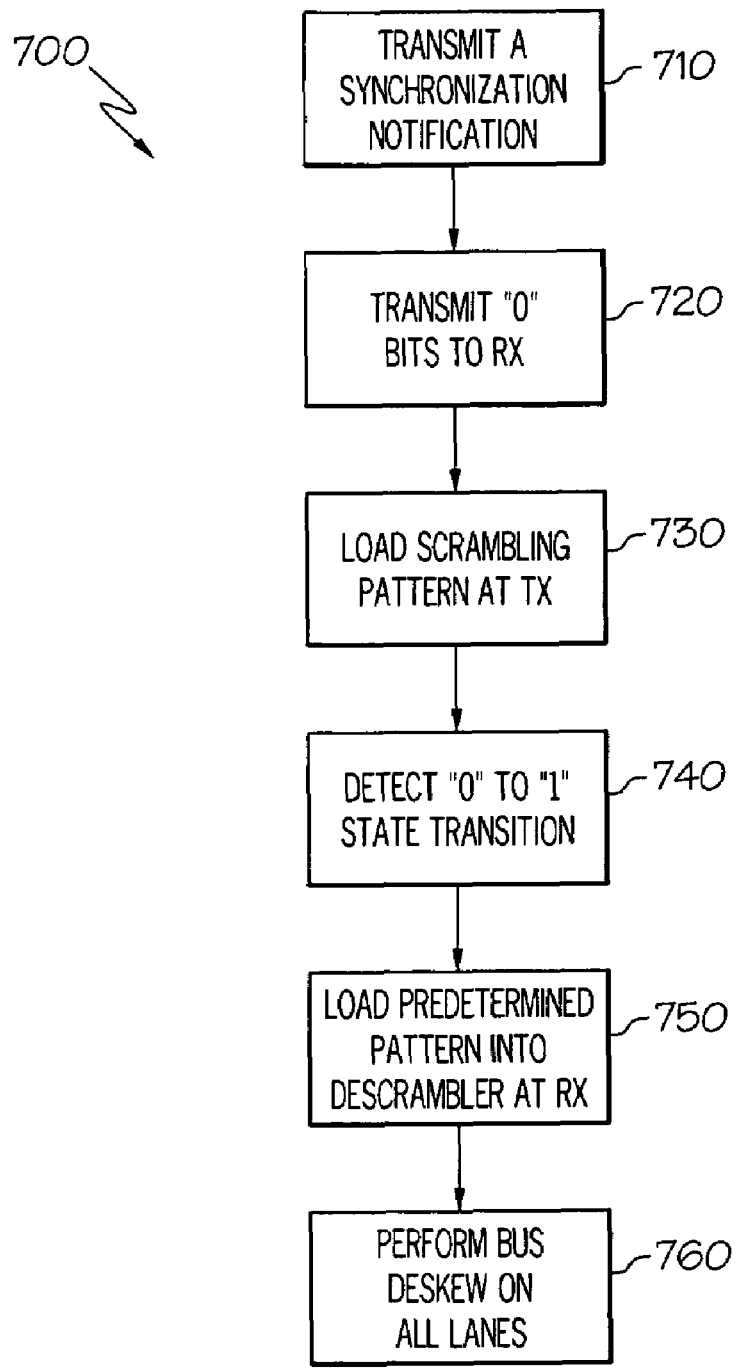
FIG. 7 illustrates a flowchart of an exemplary process for synchronizing the RX to the TX of a link system in accordance with the present teachings.

FIG. 7 illustrates a flow diagram of an overview of the process for synchronizing the RX to the TX of a link system according to an embodiment of the device and method of the present teachings. Although the flow diagram depicted in FIG. 7 indicates a particular order of operation and a specific granularity of process operations, in alternative embodiments the illustrated order may be varied (e.g., process operations may be performed in another order or performed substantially in parallel with one another) and one or more of the process operations may be coalesced or fragmented. Similarly, additional process operations may be added or eliminated where necessary in alternative embodiments.

In the illustrated process, synchronization of at least one of the RX descramblers to at least one of the TX scramblers in a link system providing PRBS scrambling on all lanes with dual tap sequences is implemented. The synchronization may occur during an initialization stage or a training sequence prior to data transmission on the communication paths. The synchronization process may be configured responsible for determining whether the bus is ready for operation. Initially in Step 710, the TX transmits a synchronization notification to the RX alerting the RX that a synchronization event is about to occur. The TX initiates the synchronization process by transmitting to the RX via an out-of band signal. In various embodiments, the out-of-band communication may be implemented as the exchange of control information in an entirely separate, dedicated lane.

After the notification, in Step 720, the TX transmits all "0" bits to the RX, which is configured with a mechanism, for example, such as an edge detector, capable of detecting a state transition, for example, a change from a state of a "0" bit to a "1" bit. In Step 730, a scrambling pattern is loaded into the TX LFSR and transmitted from the TX such that after a predetermined amount of time a state transition in the data transmission from "0" bits to "1" bits occurs. In Step 740, the edge detector in the RX detects the transition from "0" bits to "1" bits. Once the state transition is detected, a predetermined descrambling pattern is loaded into the RX LFSR of the descrambler in Step 750 to complete the synchronization process.

After the synchronization of one lane is achieved as described above, the initialization or training sequence may continue such that individual lane synchronization may be achieved by performing bus deskew optimization on all remaining lanes in Step 760. At the RX, the device deskews, that is, aligns, the lanes to compensate for lane-to-lane delay variations and clock disparity between the TX and the RX by performing FIFO pointer adjustments for each respective lanes.

In one embodiment, the device and method may be implemented in a communications link system operating with a memory interface including multiple memory modules. The memory interface may be configured to interface to any suitable type of system memory, such as Fully Buffered Dual Inline Memory Module (FB-DIMM) or a successor of this standard, Double Data Rate or Double Data Rate 2 Synchronous Dynamic Random Access Memory (DDR/DDR2 SDRAM), or Rambus.RTM. DRAM (RDRAM.RTM.), for example. In some embodiments, the memory interface may be configured to support interfacing to multiple different types of system memory.

An example of the present teachings employing an FB-DIMM successor configuration is shown in and discussed in regards to FIGS. 8 and 11A-11C. For example, in an exemplary embodiment employing an FB-DIMM successor architecture, the communication link system may include a DIMM, which comprises series of random access memory integrated circuits. The modules may be mounted on a printed circuit board and designed for use in personal computers or servers. In an FB-DIMM embodiment, an Advanced Memory Buffer (AMB) may be introduced between the memory controller and the memory module, and the configuration may include a serial interface between the memory controller and the AMB.

In yet another embodiment, the device and method may be implemented in a backplane architecture that according to, for example, CompactPCI Serial Mesh Backplane (cSMB) standard as set forth in PCI Industrial Computer Manufacturers Group (PCIMG.RTM.) specification 2.20, published by PCIMG, 301 Edgewater Place, Suite 220, Wakefield, Mass. cSMB provides infrastructure for applications such as Asynchronous Transfer Mode (ATM), 3G wireless, other proprietary or consortium based transport protocols, and the like.

In a backplane architecture, an exemplary data communications link system may include at least one line interface card communicating with any number of processor cards via a backplane to process any number of voice and/or data connections. TDM signals received at the line interface card may be embedded within ATM cells or another packet-based format prior to transmission across the backplane as a virtual circuit (VC) or the like. One or more processing cards suitably receives the VC and removes the ATM framing to extract and process the TDM data as appropriate.

In such an embodiment, each of the processing and interface cards communicating via backplane may be housed within a conventional housing, chassis, rack, cabinet or other platform such as the MXP packet transport platform. The backplane may include any bus or other interconnection between the various cards present within communications link system. As mentioned above, the backplane may be implemented using a cSMB topology standard.

FIGS. 8 and 9 illustrate examples of tap selections that may be employed as tap pairs in a dual tap sequence according the present teachings of the device and method.

The taps may be chosen to reduce or substantially minimize the correlation between sequences on adjacent lanes and to provide enough transition density on each lane to ensure clock and data recovery. The particular taps for a given application may be determined by any suitable technique. For example, suitable characteristic polynomials and associated taps may be determined by modeling particular scrambling functions based on particular characteristic polynomials and tap combinations and by performing a correlation between the scrambled data patterns generated by these exemplary scrambling functions. The selection of taps can also be based upon a random sequence of maximum length as set forth and tabulated in detail in various references, which are commonly known and understood by those skilled in the art.

For instance, FIGS. 8A-8D illustrate an example of the selection of LFSR tap pairs and lane assignments for an embodiment of an FB-DIMM successor, wherein the polynomial characteristic is $x^{23}+x^{18}+1$, as shown in FIG. 6. FIGS. 8A-8D illustrate a 14-lane assignment according to the protocols for the FB-DIMM standard. According to the protocol, the FB-DIMM channel consists of 14 "northbound" bit lanes carrying data from the memory to the processor and 10 "southbound" bit lanes carrying commands and data from the processor to the memory. In reference to FIGS. 6 and 8, a scrambler 620, such as shown in FIG. 6 and associated with the communication path, may receive taps from the $16^{th}$ and $19^{th}$ bits that are XORed by an XOR circuit 620. The result of XOR circuit 620 may then be XORed by XOR circuit 630 with the input raw data for transmission on lane 9 to generate further scrambled data for further processing and transmission as output on lane 9 of FIGS. 8A-8D.

FIG. 9 illustrates an example of a LFSR tap selection for a buffered memory system with 13 downstream (DS) lanes and 20 upstream (US) lanes for another type of advanced memory buffer (AMB). For the lane assignment, the example in FIG. 9 assumes that every eighth lane as noted, for example, (0, 8, s1) is physically far away from each other; thus, resulting in little to no crosstalk. In various embodiments, some of the tap pairs may be re-used, as FIG. 9 demonstrates. The device and method may include a possible tap selection for spare lanes, as shown in FIG. 9 having the notation, for example "s1".

An overview of the synchronization process will now be explained in further details with reference to FIGS. 10 and 11. In FIG. 11A-C, there is shown the transmission and reception hardware corresponding to a number of lanes linking the TX and RX. In FIGS. 11A-11C, the interconnect may include a number of parallel lanes, as shown, for example, as Lane0, Lane1, Lane2, etc. Each lane may be configured as a single serial connection over a physical signal carrier path, e.g. electrical or optical. Within the TX, there are a number of lane circuits and each circuit is arranged to transmit symbols allocated to a particular lane. All of the lane circuits may be driven from a single clock, and thus the outputs are synchronous with one another. At the RX, the signal received on each lane is passed to a RX lane circuit for processing to retrieve the original data transmitted by the TX.

In the beginning of a synchronization process, the LFSR of the RX may be loaded with a predetermined pattern. By using a predetermined pattern, the initiation of a synchronization process can be identified. The process may employ a single edge detection mechanism, such as an edge detector, positioned on lane0 to detect the edge position in the data stream to start the LFSR in the RX upon receipt and recognition of a predetermined pattern when transmitted from the TX.

After detection of the signal edge on lane0, the RX performs a −1 to +1 UI skew correction on lane0, followed by a skew correction within the link skew limits on all remaining lanes.

In general, skew may occur in a communication system which consists of many parallel lanes if the information bits from different lanes do not arrive at the same time (e.g., because of a delay in one or more of the lanes). The receiver may receive some "1" bits corresponding to a next transmission before the present transmission has been completed; thus, creating the condition referred to as "skew".

The above described synchronization as depicted in FIGS. 10-11 may be achieved in a three-step process as described below.

Figure 11A:
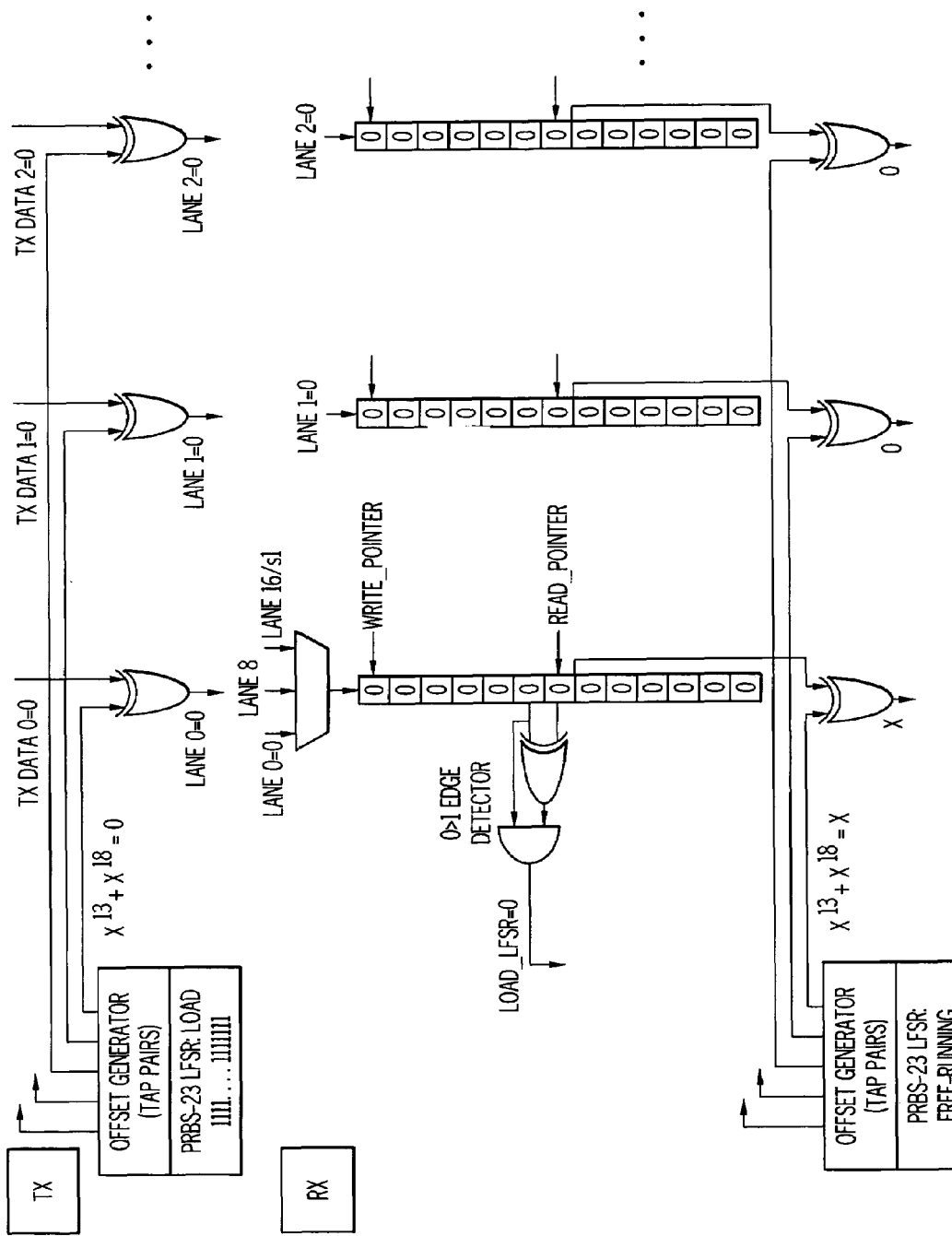
FIG. 11A depicts an exemplary embodiment of the transmission and reception hardware in accordance with the present teachings.
Figure 11B:
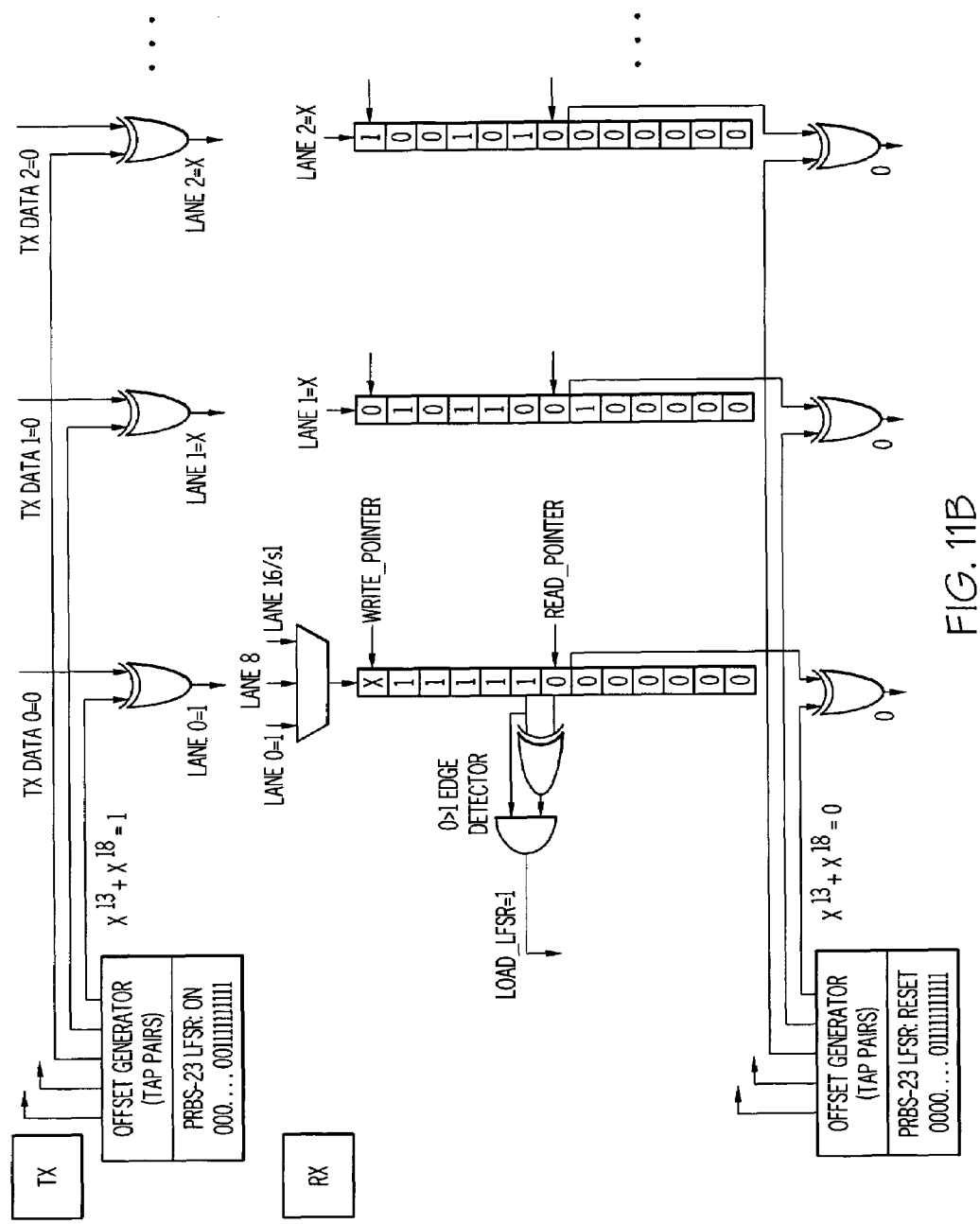
FIG. 11B depicts an exemplary embodiment of the transmission and reception hardware in accordance with the present teachings.
Figure 11C:
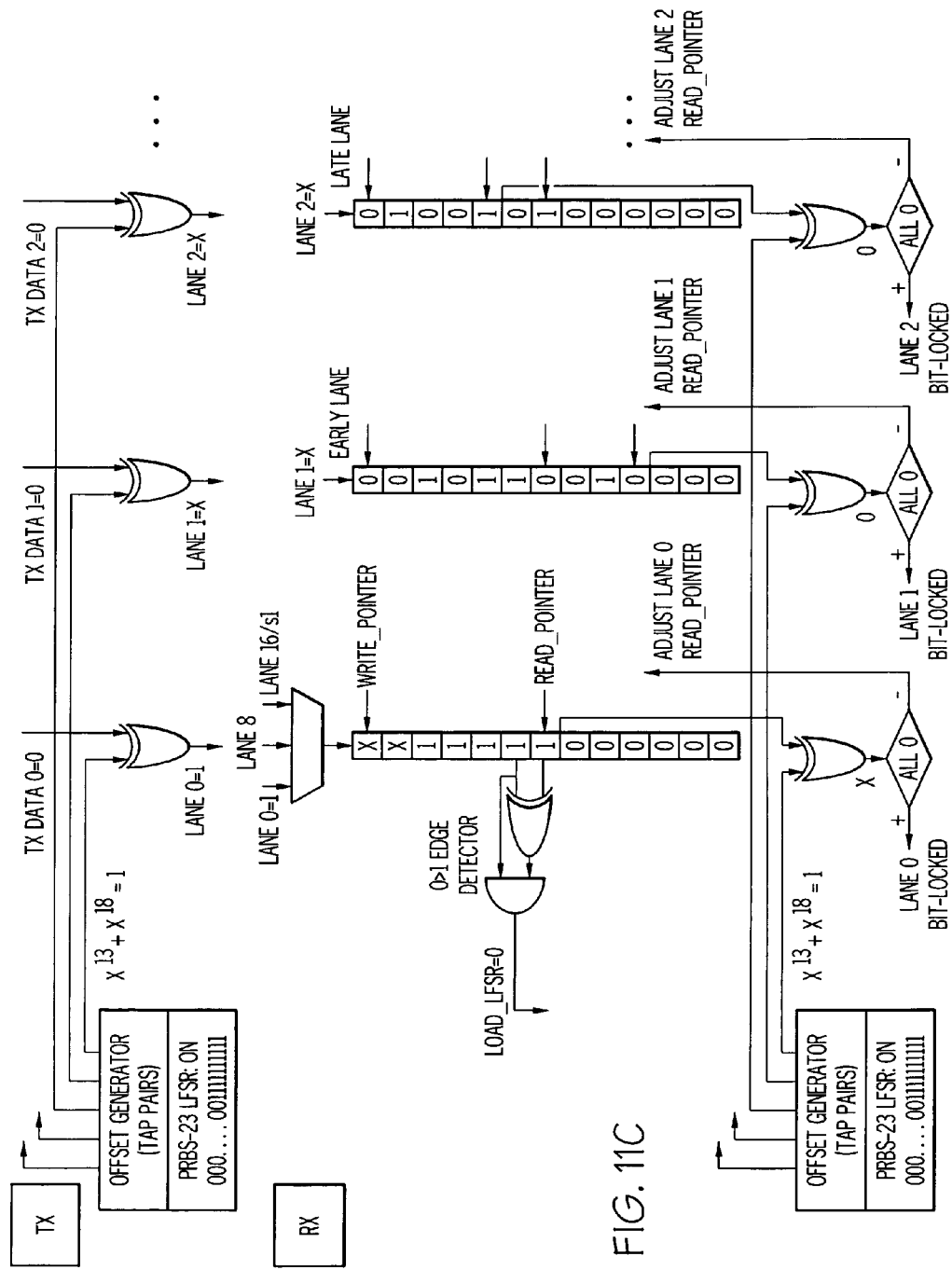
FIG. 11C depicts an exemplary embodiment of the transmission and reception hardware in accordance with the present teachings.

FIGS. 11A-C depict the RX and TX parts of an exemplary embodiment according to the present teachings of the device and method. In this example, both TX and RX use identical PRBS-23 LFSRs and identical offset generators. The offset generators provide a dual-tap XOR function for each lane according to, for example, the tap assignments of FIG. 9. The dual-tap outputs of the offset generator in the TX are XORed with the TX data (scrambler), whereas the dual-tap outputs of the offset generator in the RX are XORed with the data that is read from the read pointer positions of FIFOs (descrambler). The RX also provides a lane multiplexer on the write side of a FIFO that allows the selection of spare lanes for the synchronization process in case of lane failures. A serial implementation (1 bit transmitted per lane and clock cycle) is shown in this example; embodiments with parallel implementations (multi-bit transmission per lane and clock cycle) can easily be derived by those skilled in the art.

Step 1000: The process begins by establishing initial operating settings for the synchronization process. As shown in FIG. 11A, the process may be initiated during a training sequence. A training sequence may be employed because one important task in a digital data receiver is the provision of the correct timing phase for sampling the signal furnished by a transmission. Initially, the timing phase may bear no relation to the timing of the received signal. Thus, the system must yet be brought into synchronism. For fast synchronization, initially, a known training sequence may be transmitted prior to the actual data sequence. In this example, during a previous training state, all valid lanes are determined such that during the present training state, the system initiates the synchronization process in Step 1010 by selecting either lane0 or a valid spare lane (lane16 or s1 in the example) as the synchronization lane. In Step 1020, the process sets both TX and RX PRBS generators as free-running. In Step 1030, the process sets all TX data signals to transmit "0" bits. Step 1040 of the process resets the TX PRBS-23 generator to perform parallel loading of the LFSR such that the bits $x^1 \ldots x^{23}=1$ in a single clock cycle. Alternatively, the reset state of the TX PRBS can be maintained for several or multiple clock cycles to provide the RX a sufficient preparation time.

In Step 1050, the process sets the read and write pointers of the receive FIFO that is provided to remove skew between the lanes that may have been introduced by the bus. The maximum "skew" is defined as the difference in time between when the data arrives on the earliest lane and when data arrives on the latest lane.

According to various embodiments, as shown in FIGS. 11A-C, the receiver may employ a plurality of FIFO's (first-in, first-out queues) to reassemble the parallel transmitted data. A write pointer keeps track of the next position available for writing to the FIFO, and a read pointer keeps track of the next position to be read from the FIFO. In this exemplary embodiment, the RX read pointer is set in the center of the FIFO queue, and the write pointers and the read pointers are set as free running pointers that increment by one bit position in each clock cycle.

For each lane at the receiver, data may be captured by a regenerated clock linked to that particular lane. The device and method may employ a deskewing circuit to synchronize the regenerated clocks from all lanes up to a single clock, align all the lanes such that the ordered data sets transmitted in parallel are received correctly and compensate for the differences between the transmitter and receiver clocks.

Figure 10A:
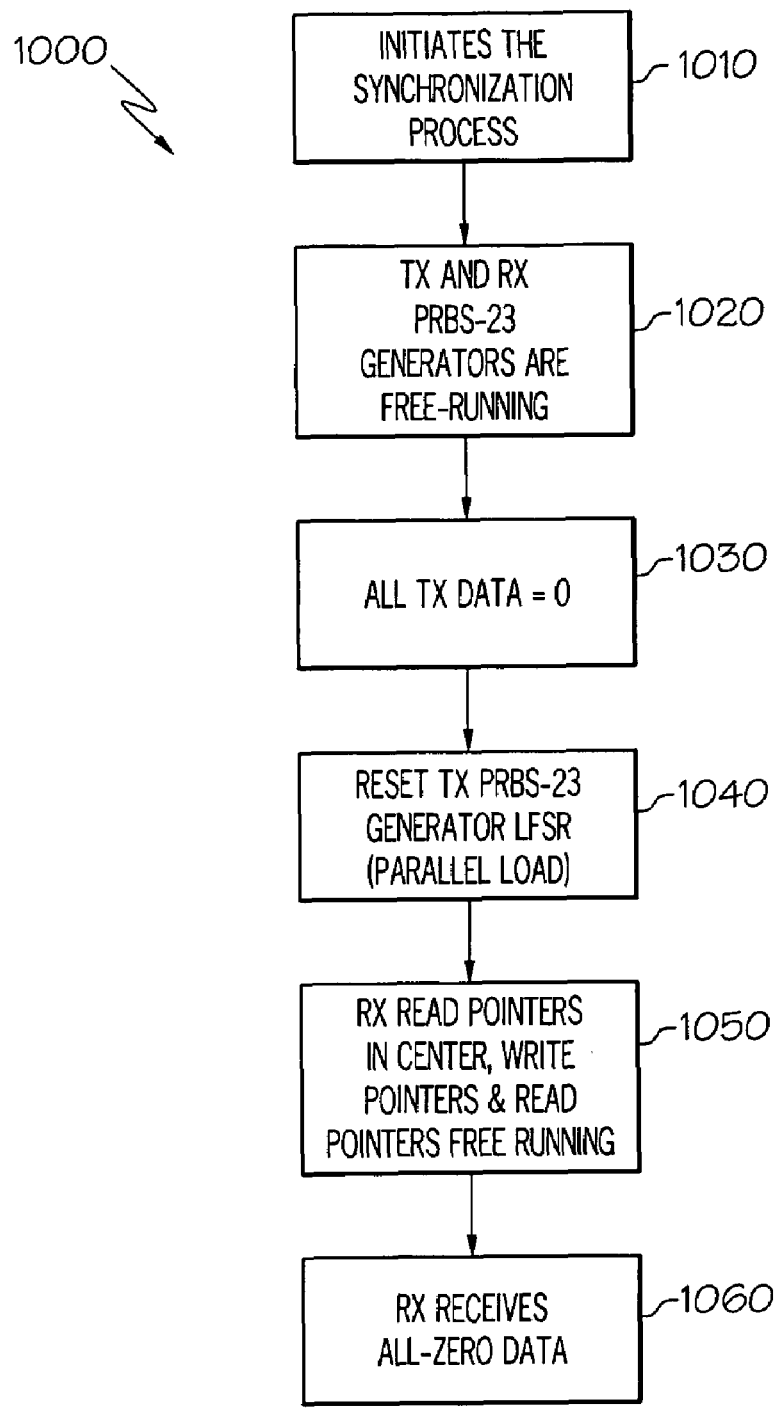
FIG. 10A illustrates a flowchart of an exemplary process for synchronizing the RX to the TX of the link system shown in FIG. 11A.

In Step 1060, the RX receives the all-zero data transmission sent from the TX. The example in FIGS. 10A and 11A is based on the assumptions that Lane0 is used for the PRBS synchronization wherein the tap pair is $x^{13}+x^{18}$ and the process is performed in a serial implementation (1 bit per clock cycle). It should be understood that the configuration shown and described in reference to FIGS. 11A-11C are nonlimiting and exemplary only. Those skilled in the art would understand that various configurations and settings may be envisioned without departing from the scope of the present teachings. For example, in an alternative embodiment, the device and method may be configured to have a parallel implementation (multiple bits per clock cycle) and an alternative lane may be used for the PRBS synchronization.

Figure 10B:
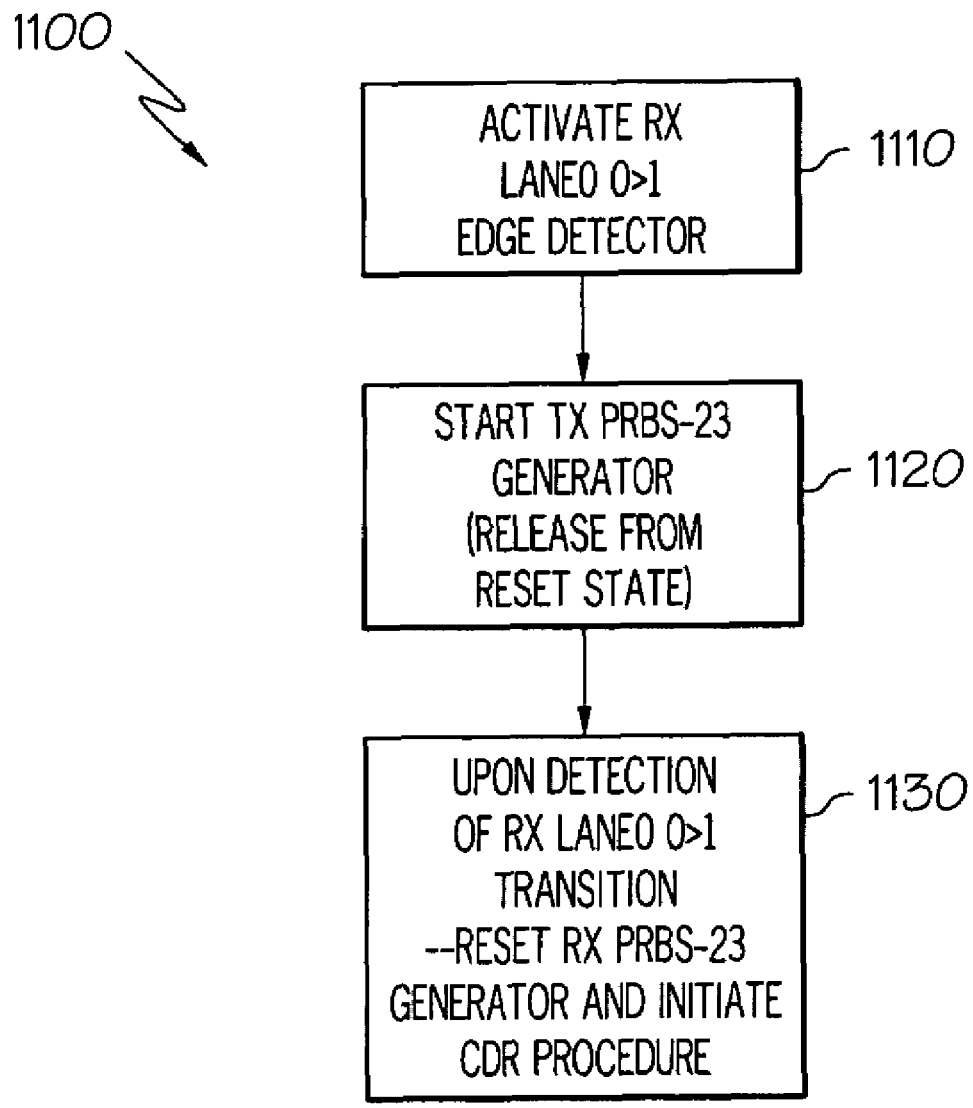
FIG. 10B illustrates a flowchart of an exemplary process for synchronizing the RX to the TX of the link system shown in FIG. 11B.

Step 1100: As shown in FIGS. 10B and 11B, the system may employ an edge detector to initiate a state transition detection process. In Step 1110, the edge detector on Lane0 is activated to detect a state transition from "0" bits to "1" bits. In Step 1120, the TX PRBS-23 generator is initiated by releasing it from the reset state. As the TX LFSR continues to be filled with "0" bits, when the sequence of "0" bits arrives at the TX LFSR at bit $x^{13}$, the output of Lane0 transitions to "1" bits. In Step 1130, upon the detection of the transition from "0" bits to "1" bits by the edge detector on Lane0, the system resets the RX PRBS-23 generator to perform parallel loading such that, in this example, the LFSR bits are set to: $x^1 \ldots x^{12}=0, x^{13} \ldots x^{23}=1$ in a single clock cycle. Optionally, the detection of the transition may also initiate a clock and data recovery (CDR) fast-lock procedure, which may be performed by CDR circuits (not shown) included in the system.

Figure 10C:
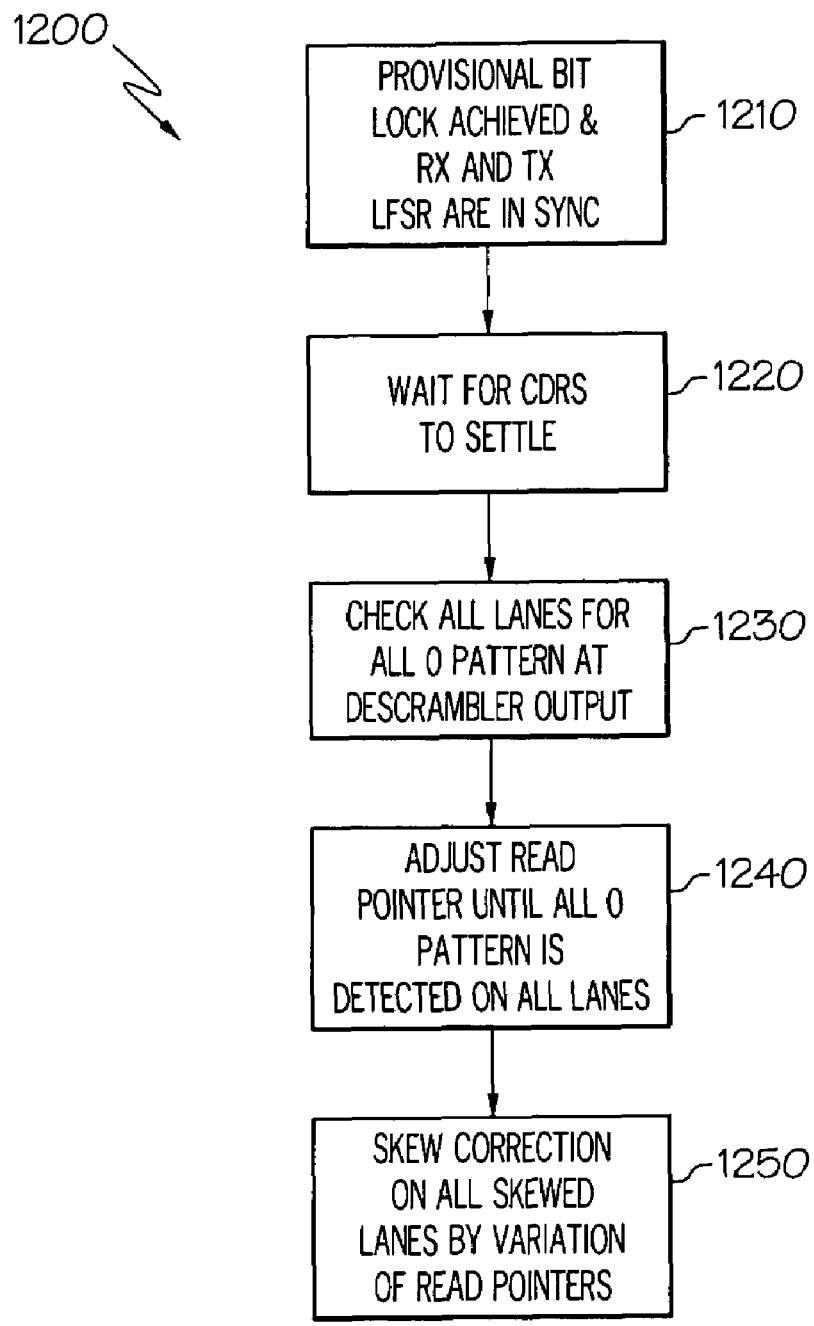
FIG. 10C illustrates a flowchart of an exemplary process for synchronizing the RX to the TX of the link system shown in FIG. 11C.

Step 1200: As shown in FIGS. 10C and 11C, at the RX, the process then performs skew correction on Lane0 and all other lanes. In Step 1210, one bit cycle after the reset of the RX PRBS-23 generator, the provisional bit lock should be achieved and the RX and TX LFSR should be synchronized. The FIFO read pointer of Lane0 is now correct within +−1 bit position, whereas the FIFO read pointers of all other lanes are correct within +−multiple bit positions depending on the skew limit specification of the transmission system. In Step 1220, the process may wait for a predetermined time for the CDR circuits to settle. The wait time period may be approximately 200 ns, in this example, or any time necessary for the CDR circuits to settle. In Step 1230, the process checks for all zero patterns at the descrambler output on every lane. For example, the process may check each descrambler to determine whether consecutive "0" bits have been received and processed as output for a predetermined time, such as, for example, greater than 22 UI.

In Step 1240, the process then performs a −1 UI to +1 UI skew correction on lane0 by implementing a FIFO pointer adjustment. As shown in FIG. 11C, the process adjusts the read pointers by −1 to +1 bit position by checking for all-zero pattern in the descrambled data until an all "0" pattern is detected. After the skew correction is performed on lane0, the process in Step 1250 performs skew correction on the remaining lanes by variation of the read pointer, likewise, by checking for an all-zero pattern in the descrambled data on all early and late lanes such that each lane's read pointers correspond with the read pointer on lane0. In FIG. 11C, for example, lane 1 is adjusted as an early lane, and lane 2 is adjusted as a late lane.

The flow diagrams depicted herein are just examples. There may be many variations to these diagrams or the steps (or operations) described therein without departing from the spirit of the present disclosure. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims and without departing from the scope and the teachings of the present disclosure. Thus, the claims should be construed to maintain the proper protection for the present disclosure.

What is claimed is:

1. A method for synchronizing interconnects in a link system, the method comprising:
   receiving input data at a transmit side, the transmit side including at least one pseudo-random bit sequence scrambler;
   scrambling the input data at the transmit side via the pseudo-random bit scrambler with dual tap sequences resulting in scrambled data;
   transmitting the scrambled data with the dual tap sequences along all lanes of a plurality of lanes to a receive side via a bus interconnecting the plurality of lanes, the receive side including at least one pseudo-random bit sequence descrambler, and the receive side directly connected to the transmit side via the bus;
   synchronizing the at least one pseudo-random bit sequence scrambler to the at least one pseudo-random bit sequence descrambler, wherein the synchronizing comprises:
      transmitting from the transmit side to the receive side a synchronization notification via an out-of-band communication;
      transmitting from the transmit side all zero bits to the receive side;
      loading a scrambling pattern into the at least one pseudo-random bit sequence scrambler and transmitting the scrambled data from the transmit side to the receive side;
      detecting a state transition within the transmitted scrambled data employing an edge detection device positioned at the receive side of one of the plurality of lanes used as a synchronization lane;
      loading and initiating within the at least one pseudo-random bit sequence descrambler a predetermined descrambling pattern;
   de-scrambling the transmitted scrambled data at the receive side resulting in the input data;
   after completing the synchronizing, performing a skew correction on the synchronization lane by adjusting at least one FIFO pointer on the synchronization lane; and
   after skew correcting the synchronization lane, performing a skew correction on any remaining skewed lanes of the plurality of lanes by adjusting at least one FIFO pointer on each of the skewed lanes.

* * * * *